United States Patent
Tsukamoto et al.

[11] Patent Number: 6,140,648
[45] Date of Patent: Oct. 31, 2000

[54] COMPOUND-EYE CRIME PREVENTION SENSOR SYSTEM

[75] Inventors: Kazuo Tsukamoto; Koichi Iriyama, both of Kyoto, Japan

[73] Assignee: Takenaka Engineering Co., Ltd., Kyoto, Japan

[21] Appl. No.: 09/155,498

[22] PCT Filed: Jan. 29, 1998

[86] PCT No.: PCT/JP98/00404

§ 371 Date: Sep. 14, 1998

§ 102(e) Date: Sep. 14, 1998

[87] PCT Pub. No.: WO98/34085

PCT Pub. Date: Aug. 6, 1998

[30]     Foreign Application Priority Data

Jan. 30, 1997  [JP]  Japan ................................. 9-032862

[51] Int. Cl.⁷ .................................................. G08B 13/18
[52] U.S. Cl. .................. 250/353; 250/338.3; 250/DIG. 1
[58] Field of Search .............................. 250/353, DIG. 1, 250/338.3

[56]           References Cited

U.S. PATENT DOCUMENTS 4,339,748   7/1982   Guscott et al. .
4,618,854  10/1986   Miyake et al. ............................ 250/342
4,849,635   7/1989   Sugimoto .
6,037,594   3/2000   Claytor et al. ............................ 250/353

FOREIGN PATENT DOCUMENTS 9-166665   6/1997   Japan .
9-292473  11/1997   Japan .

*Primary Examiner*—Constantine Hannaher
*Assistant Examiner*—Otilia Gabor
*Attorney, Agent, or Firm*—Armstrong, Westerman, Hattori, McLeland & Naughton

[57]                ABSTRACT

A compound-eye crime prevention sensor system is constructed which reliably distinguishes between a human being and a small animal irrespective of the distance from the detector. This system has a zone spacing changer, and when the detection zones A and B of the detector 1 are at the farthest point L in the trespassing subject detecting range, the spacing between the detection zones A and B is $\theta L$ and when the optical unit in the detector 1 is rotated to bring the detection zones to the position of a point S, the spacing $\theta S$ between the detection zones A and B is greater than the spacing $\theta L$ which results from adjusting the detection zones to the farthest point L.

3 Claims, 5 Drawing Sheets

COMPOUND-EYE CRIME PREVENTION SENSOR SYSTEM

TECHNICAL FIELD

This invention relates to a compound-eye crime prevention sensor system which comprises two, upper and lower, detection zones which are to be crossed by a trespassing subject to be detected.

BACKGROUND ART

In detectors used in a trespass warning system, the system which has been put to frequent use in recent years comprises two pyroelectric elements made of ferroelectric material horizontally disposed side by side, the outputs thereof being connected in series or parallel to derive a differential output. This is called the twin type pyroelectric elements or twin sensors. Further, a compound-eye crime prevention sensor system, which is called the dual twin type pyroelectric elements, comprising two, upper and lower, twin type pyroelectric elements has already been put to practical use. For this compound-eye crime prevention sensor system, refer to Japanese Patent Publication No. 12,358 of 1991 and Japanese Laid-Open Patent Publication No. 143,873 of 1993.

The compound-eye crime prevention sensor system comprises a pair of detection axes substantially horizontally spaced and extending in substantially the same direction in a predetermined space, another pair of detection axes disposed above or below said pair of detection axes and extending in directions respectively corresponding to said detection axes, a far infrared ray focussing mirror disposed on the side of the device associated with these two pairs of detection axes for focussing radiant energy falling along each axis, and dual twin type pyroelectric elements corresponding to them at the focal point corresponding to said two pairs of detection axes in the focal planes of said far infrared ray focussing mirrors.

In said compound-eye system, the four detection zones formed by the optical unit comprising the dual twin type pyroelectric elements consisting of the two, upper and lower, twin type pyroelectric elements and by one far infrared focussing mirror, extend along said detection axes in substantially the same direction but, stated strictly, they are geometrically not parallel (widening angle being 0°); the four detection zones extend with some amount of widening angle. In the present invention, the wording "substantially parallel" or the like also refers to the case where they extend with some amount of widening angle. The size of the upper and lower twin type pyroelectric elements, and the distance between the upper and lower elements have been preset at particular values. The detection zones respectively associated with the detection axes and extending from the optical unit constituted by the twin type pyroelectric elements of fixed shape and the far infrared ray focussing mirror having a fixed focal length grow thicker as they are further away from the optical unit. In the detector for detecting trespassing subjects, with consideration given to the size of the cross section of the detection zones and the size of human beings who walk across the detection zones, the limit distance beyond which the detection efficiency drops is defined as the farthest point of the trespassing subject detection range.

For example, the size of the cross section of one detection zone in the farthest point in this kind of detector for which the distance to the farthest point of the trespassing subject detection range is set at 12 m, is about 0.3 m wide and about 0.5 m high. There are four detection zones of this size disposed at upper and lower and right and left positions, 0.3 m spaced away from each other, and grouped together to form the detection zone of a compound-eye crime prevention sensor system.

FIG. 1 is a side view showing the layout of a conventional compound-eye crime prevention sensor system. The numeral 1 denotes a detector and L denotes the position which determines the farthest point of the trespassing subject detection range. This detection range is defined by upper and lower detection zones Z1, Z2 extending in substantially the same plane from upper and lower twin elements. The numeral 2 denotes a ceiling surface to which the detector is fixed. A human being H moving in a direction from the viewer's side of the drawing to the other side of vise versa in the vicinity of the position indicated by L will cross the upper and lower detection zones at the same time without fail, whereas a small animal N moving about in this place never crosses the upper and lower detection zones at the same time. The detection zones Z1' and Z2' shown in broken lines in the figures define the trespassing subject detection range which results when the optical unit in the detector 1 is turned downward to move the detection zones to the position S close to the detector.

The effective distance between the detection zones Z1' and Z2' decreases by an amount corresponding to the amount by which the distance to the farthest point is shortened in the detection zones subsequent to the change as it moves to the position S. Therefore, a human being H walking in the vicinity of the position S in a direction from this side of the drawing to the other side of vise versa crosses the upper and lower detection zones at the same time, of course. However, when a small animal passes the position S, it moves transversely of both the upper and lower detection zones while nearly grazing these detection zones.

Therefore, in a compound-eye crime prevention sensor system which, only when a subject crosses the upper and lower detection zones at the same time, performs a particular signal treatment to decide that it is a trespassing subject, there is a possibility that the movement of a small animal is erroneously recognized as the movement of a trespassing subject (human being) despite the fact that is actually the movement of a small animal if the spacing between the upper and lower zones is decreased in the detection space by changing the angle of the detection zones extending from the detector. Thus, in the conventional system in which the geometrical relation between the upper and lower detection zones is fixed, there has been a problem that the distinction between the human being and a small animal cannot be clearly made.

DISCLOSURE OF THE INVENTION

The present invention is intended to provide a crime prevention sensor system designed such that in order to eliminate the disadvantages of the conventional compound-eye crime prevention sensor system described above, it allows changing the vertical spacing between detection zones disposed in two, upper and lower stages, extending in the direction in which a subject to be detected trespasses. Therefore, according to the invention, a clear distinction between a human being and a small animal can be made irrespective of the distance from the detector.

The invention provides a compound-eye crime prevention sensor system including a detection axis extending in a lookout direction in a predetermined space, and another detection axis which, above or below said first axis, extends in the direction corresponding to and parallel with said first axis, the arrangement being such that whether a subject to be detected crosses both axes at the same time or only one of them is detected, whereby the size of the subject is recognized, said compound-eye sensor system being characterized in that it includes detection axis spacing changing means for changing the spacing between the upper and lower detection axes according to the set angle of either the upper or lower detection axis.

BEST MODE FOR EMBODYING THE INVENTION

Figure 1:
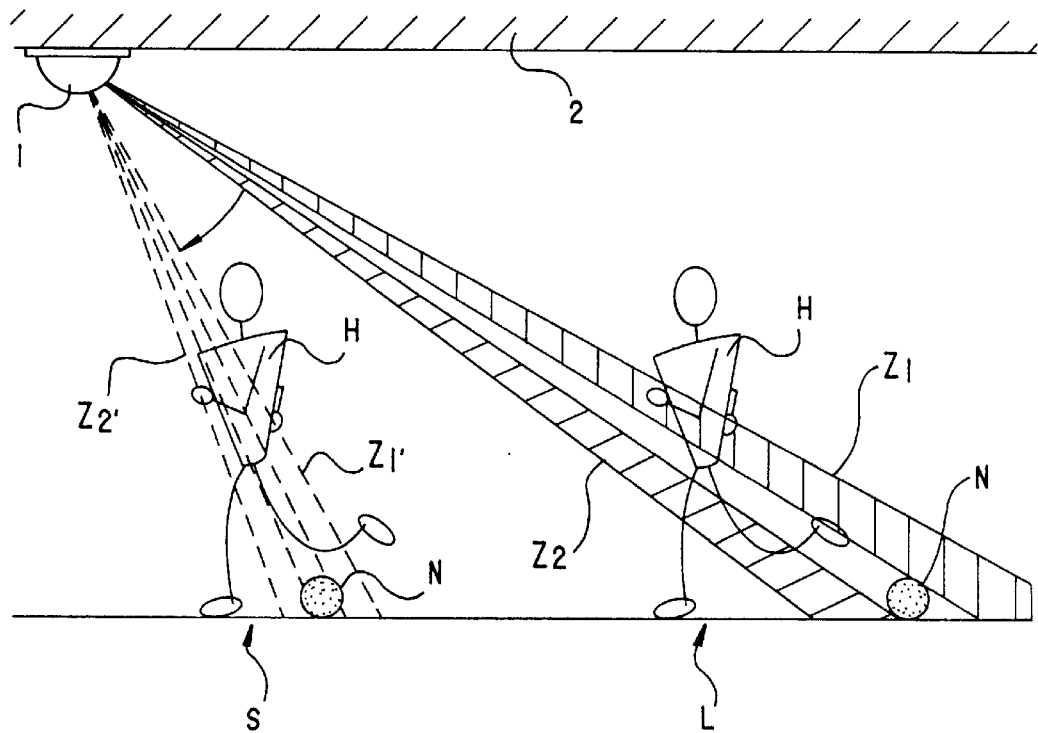
FIG. 1 is a side view showing the layout of the detecting section of a conventional crime prevention sensor system.
Figure 2:
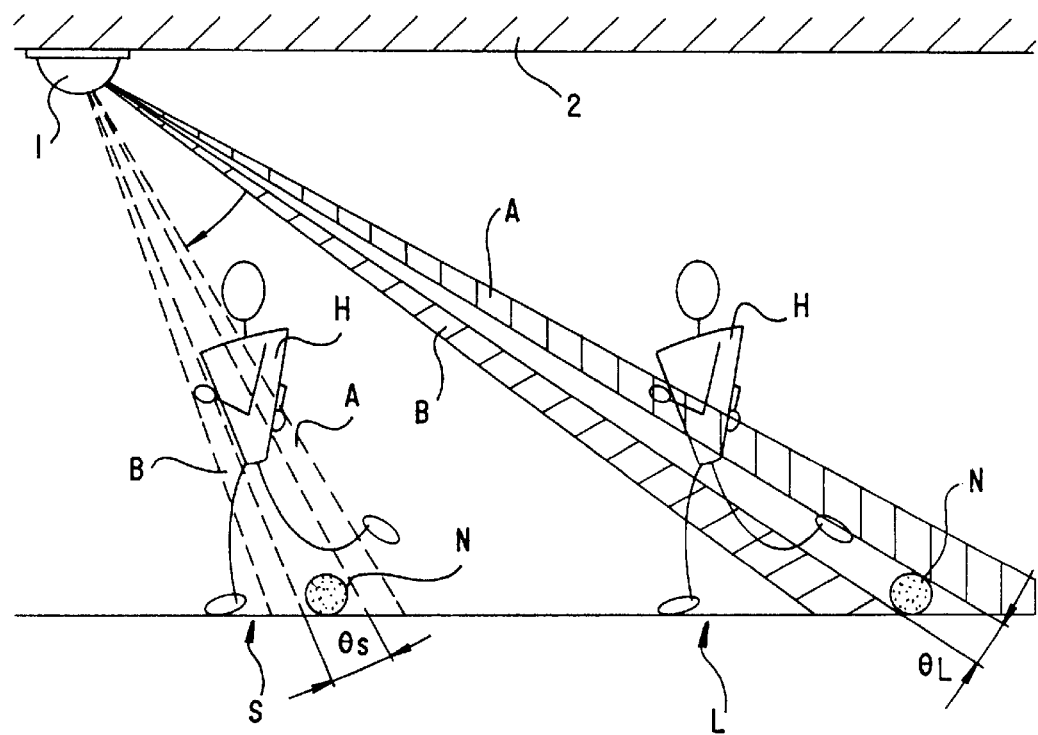
FIG. 2 is a side view showing the layout of the detecting section of a crime prevention sensor system according to the present invention.

FIG. 2 is a side view showing the layout of a sensor system according to the invention. In FIG. 2, as in FIG. 1 showing the conventional system using the prior art, 1 denotes a detector; L denotes the farthest point of the trespassing subject detecting range; and 2 denotes a ceiling surface on which the detector is fixed. Housed in the detector 1 are two pairs, upper and lower, of twin sensors and a far infrared ray focussing mirror, to be later described in more detail, thereby defining detection zones A and B extending in the same vertical plane in substantially the same direction (parallel).

Figure 3:
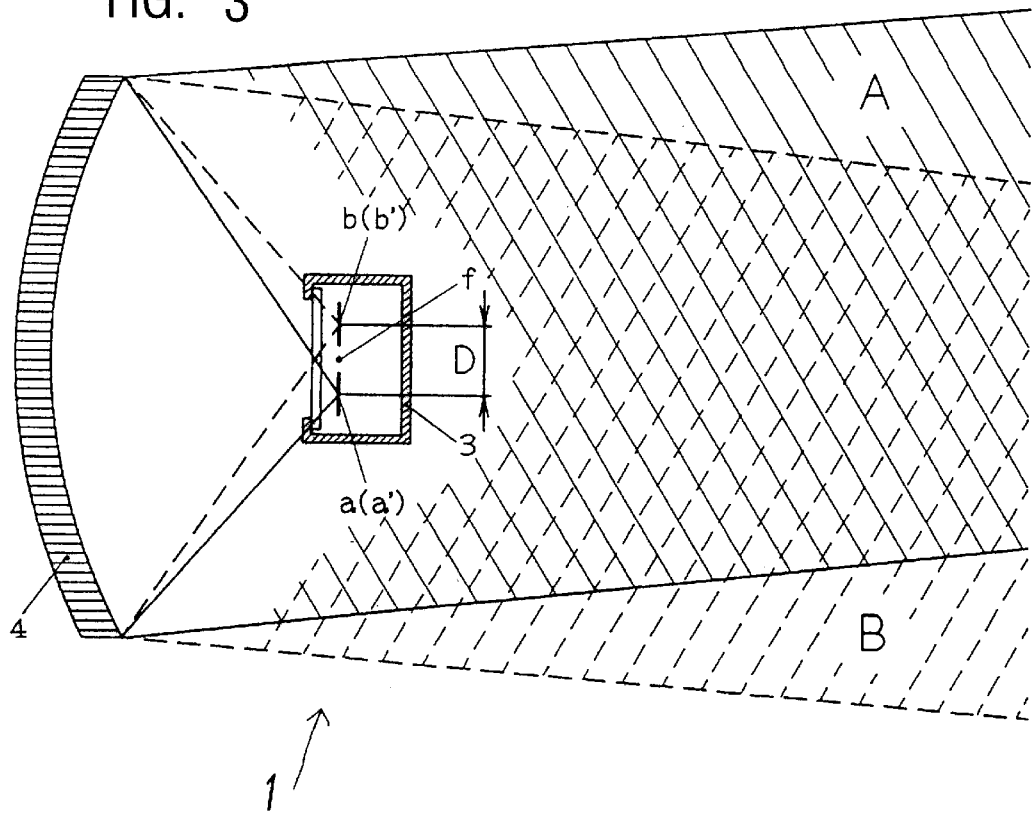
FIG. 3 is a side view, in section, showing the arrangement of an optical unit according to the invention.

FIG. 3 is a side view, in section, showing the positional relation between the two pairs of twin sensors and the far infrared ray focussing mirror housed in the detector 1 of FIG. 2. The numeral 3 denotes a dual twin type unit having two pairs of twin sensors a, a' and b, b' in the form of pyroelectric elements and 4 denotes a parabolic mirror (infrared ray focussing mirror) for focussing far infrared rays on the dual twin type unit. The twin sensors a, a' and b, b' are positioned with a spacing D in the vicinity of the focal point f of the parabolic mirror 4, thereby defining the detection zones A and B. The dual twin type unit and the parabolic mirror cooperate with each other to form an optical unit rotatable within the detector 1.

The upper detection zone A in the reference state shown in solid lines in FIG. 2 is disposed so that it corresponds to the range between the breast and waist of a human being H who is walking in the vicinity of the farthest point L in the trespassing subject detecting range, while the lower detection zone B is disposed so that it corresponds to the height of the legs. Therefore, a human being walking around this corresponding position crosses the detectors A and B at the same time. A small animal, such as a mouse as large as indicated by N in the figure will sometimes cross either the detection zone A or the detection zone B separately but never crosses both at the same time. The detection range shown in broken lines in FIG. 2 shows the lateral plane of the detection zones resulting from turning the optical unit comprised of the dual twin type pyroelectric elements and parabolic mirror housed in the detector 1 and changing the direction of the detection zones to turn them more downward. This change of direction has been made according to the invention such that the spacing between the detection zones A and B is not decreases.

The spacing $\theta_S$ between the detection zones A and B (in this figure, the angle formed between the detection zones A and B) is increased as compared with the spacing $\theta_L$ which results when the detection zones are directed to the position L. As a result, even if the small animal N moves around the position S, it will never cross both the detection zones at the same time. The change of the angle formed between the detection zones is attained by changing the spacing D between the two twin sensors a and b shown in FIG. 3. That is, when the detection zones are directed more downward, the spacing between the two twin sensors a and b is increased. The change of the twin sensor spacing is made by providing two stages for long and short distances according to the detection range of the detector 1 so that the detection range may be switched to one of the stages according to the angle of the optical unit. Further, this change is not limited to two stages; three or more stages may be provided or a slide type may be employed to fix the range at a desired position.

Figure 4:
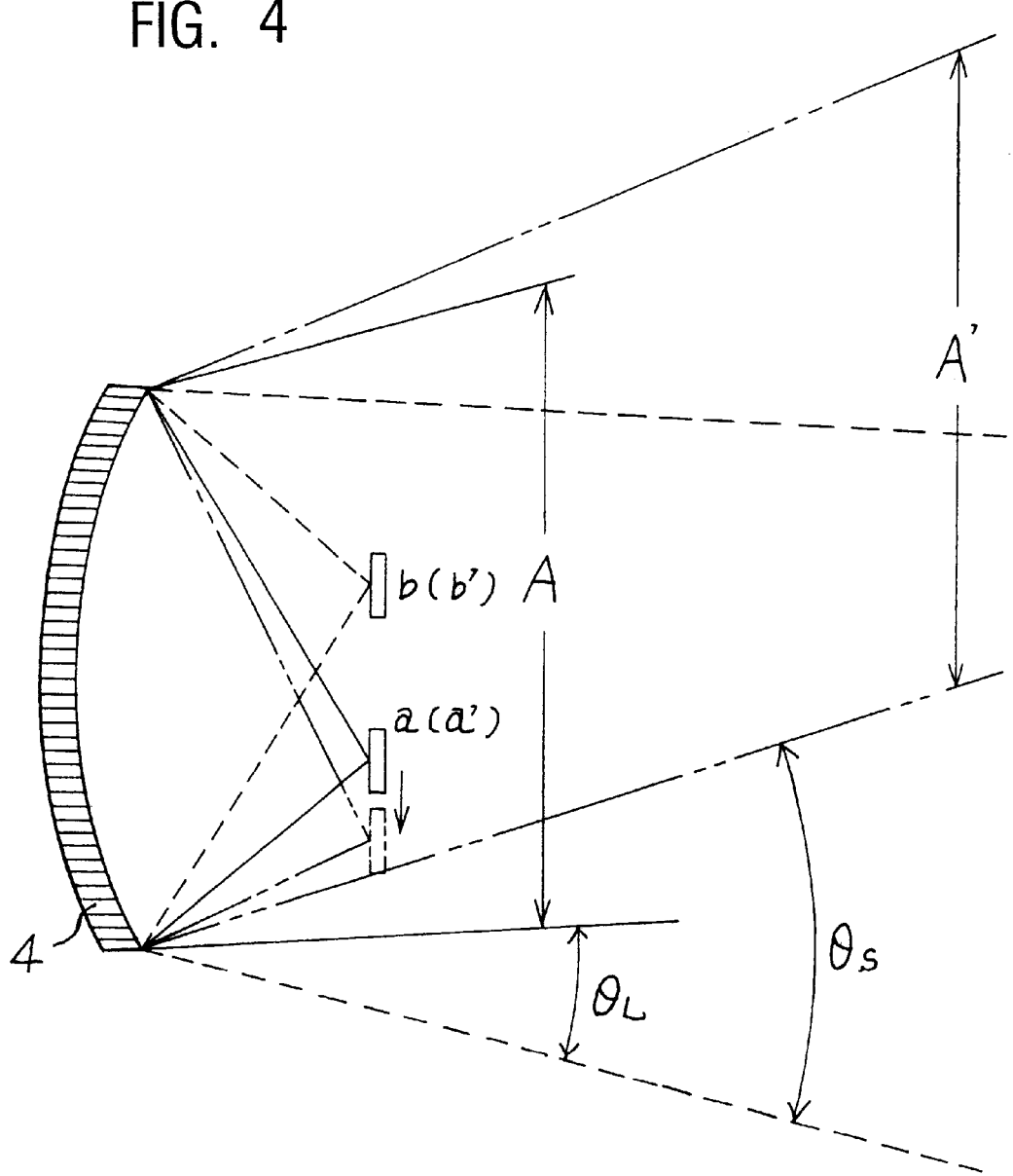
FIG. 4 is a schematic view, illustrating the principle that by changing the distance between two twin sensors, the spacing between the detection zones of the twin sensors is changed, with the angle of a parabolic mirror 4 fixed.

FIG. 4 illustrates the principle that the zone spacing (angle $\theta_L$) for long distance and the zone spacing (angle $\theta_S$) for short distance in the optical unit shown in FIG. 2 may be obtained, for example, by moving the twin sensor a (a') further away from the twin sensor b (b') with the angle of the parabolic mirror 4 fixed. That is, it can be seen that the downward movement of the twin sensor a (a') to the position shown in phantom lines results in the detection zone A being turned more upward to assume a new detection zone A', bringing about an angular increase leading to the aforesaid angle $\theta_S$ of zone spacing (shown as the angle for the lower limit line spacing between the zones A' and B).

As another embodiment, the upper and lower detection zones may be defined by a combination of two sets of optical units using two twin sensors and two parabolic mirrors, while attaining the adjustment of the direction of the detection zones by separate rotational movements of the two rotatable optical units. In this case, the two optical units may be interconnected by a link mechanism adapted to rotate them such that a gradual difference in phase is produced to ensure that said detection zone spacing change is automatically effected according to the angular change of the detection zones. Such link mechanism may be based on the principle of the Ackerman steering gear used in steering devices for automobiles.

FIGS. 5–8 show the structural principles of compound-eye optical units, including said Ackerman steering gear mechanism described above, for angularly displacing two optical systems simultaneously and with a predetermined amount of difference of displacement so as to determine the size of the trespassing subject through a wide angle watch range, that is, distinguish between a human being and a small animal.

Figure 5:
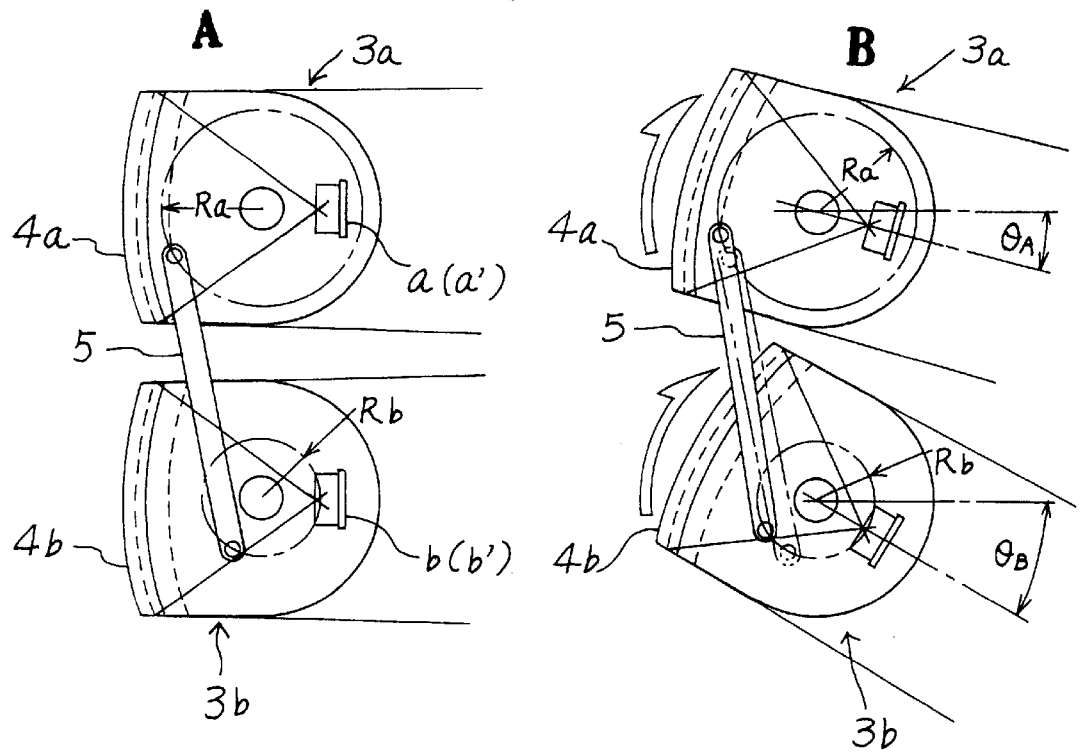
FIG. 5 is a schematic view showing an embodiment of a mechanism in which two optical units are interconnected by a link so that the spacing between detection zones is changed as the optical units are rotated.

In an embodiment show in FIG. 5, an optical unit 3a consisting of a parabolic mirror 4a and a twin sensor a (a') is connected to an optical unit 3b consisting of a parabolic mirror 4b and a twin sensor b (b') by a link 5 at positions Ra and Rb (Rb<Ra) spaced from the respective rotation centers of the units. Thus, in the state B in which each unit has been turned downward for short distance watch in contrast to the reference state A for long distance watch, it is clear that for the rotation angle of the optical unit 3b is $\theta_B$ as compared with the rotation angel $\theta_A$ of the optical unit 3a ($\theta_B > \theta_A$).

Figure 6:
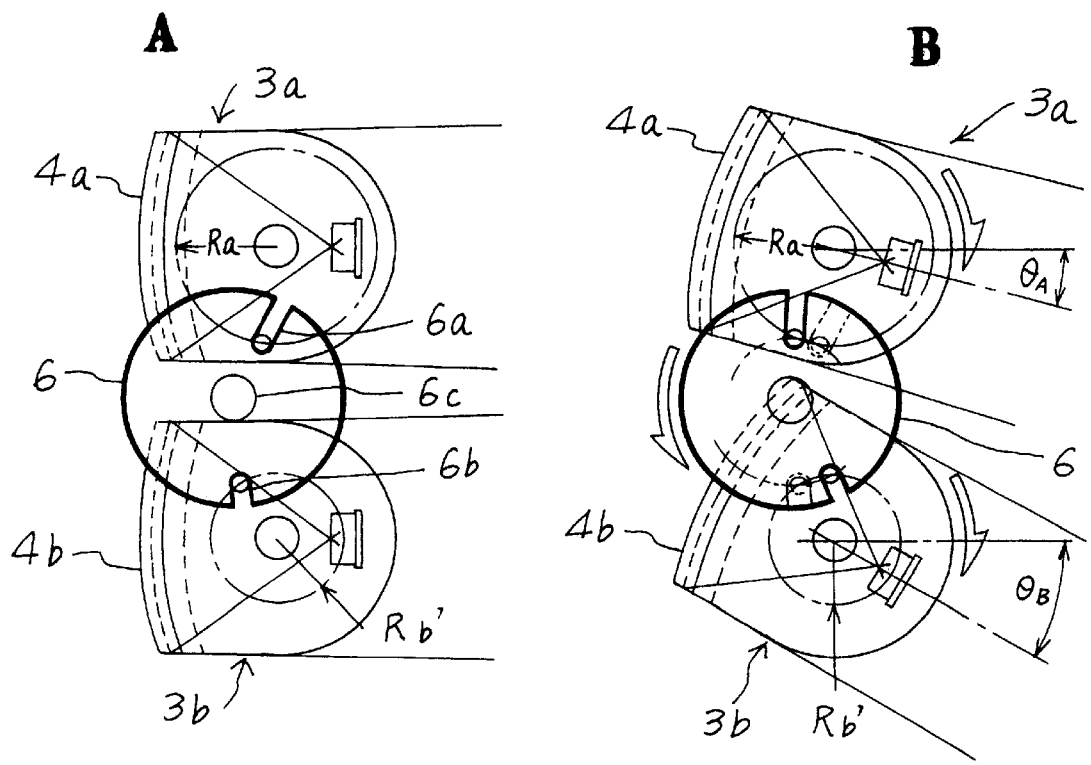
FIG. 6 is a schematic view showing an embodiment of a mechanism in which two optical units are interconnected by a groove cam disk so that the spacing between detection zones is changed as the optical units are rotated.

In an embodiment shown in FIG. 6, optical units 3a and 3b similar to those described above are interconnected in that pins respectively disposed at positions Ra and Rb' (Rb'<Ra) spaced from the rotation centers of the units are placed in grooves 6a and 6b in a groove cam disk 6 fixed to a shaft 6c positioned intermediate between the units 3a and 3b. Therefore, in the state B in which the units have been turned downward for short distance watch, in contrast to the reference state A for long distance watch, it is possible to obtain the rotation angle $\theta_B$ of the optical unit 3b which is greater than the rotation angle $\theta_A$ of the optical unit 3a.

Figure 7:
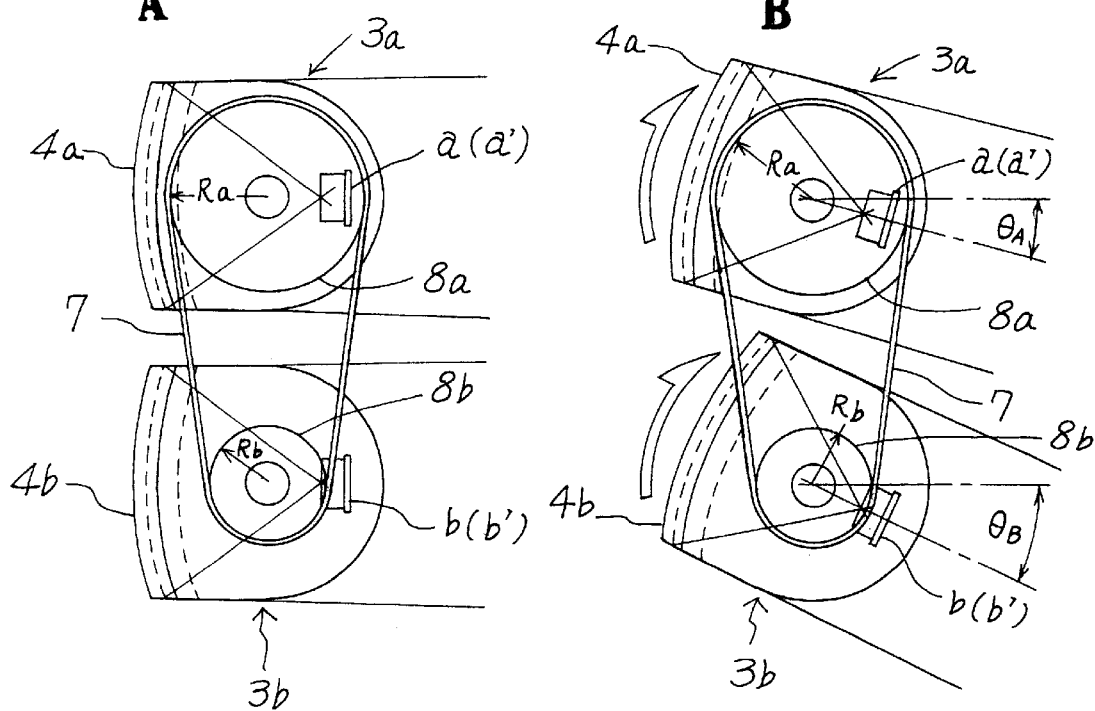
FIG. 7 is a schematic view showing an embodiment of a mechanism in which two optical units are interconnected by a belt/pulley mechanism that the spacing between detection zones is changed as the optical units are rotated.

In an embodiment shown in FIG. 7, optical units 3a and 3b similar to those described above are interconnected in that pulleys having radii Ra and Rb (Rb<Ra, the ratio being the same as in the embodiment shown in FIG. 5) measured from the rotation centers of the units have a belt or chain 7 entrained therearound. Therefore, in the state B in which the units have been turned downward for short distance watch in contrast to the reference state A for long distance watch, the rotation angle $\theta_B$ of the optical unit 3b greater than the rotation angle $\theta_A$ of the optical unit 3a can be obtained.

Figure 8:
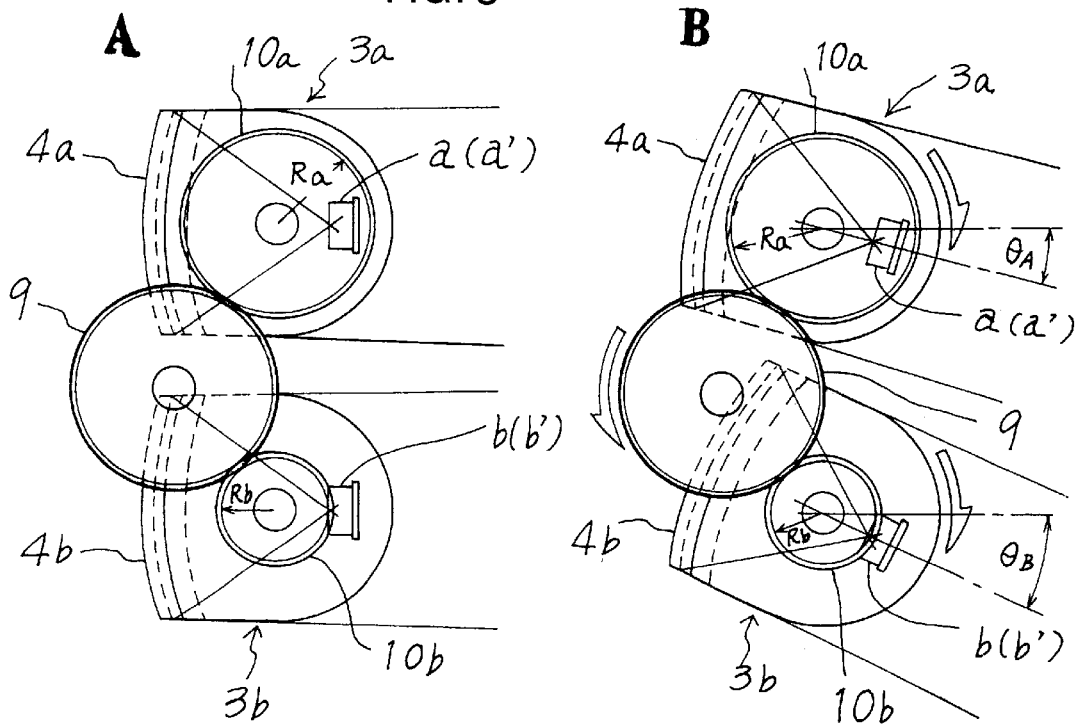
FIG. 8 is a schematic view showing an embodiment of a mechanism in which two optical units are interconnected by a gear train that the spacing between detection zones is changed as the optical units are rotated.

In an embodiment shown in FIG. 8, optical units 3a and 3b similar to those described above are interconnected in that gears 10a and 10b whose radii from the rotation centers of the units are Ra and Rb (Rb<Ra, with the same ratio as in the embodiment shown in FIG. 5) have an intermediate gear 9 interposed therebetween to mesh therewith. Therefore, in the state B in which the units have been turned downward for short distance watch in contrast to the reference state A for long distance watch, the rotation angle $\theta_B$ of the optical unit 3b greater than the rotation angle $\theta_A$ of the optical unit 3a can be obtained.

Figure 9:
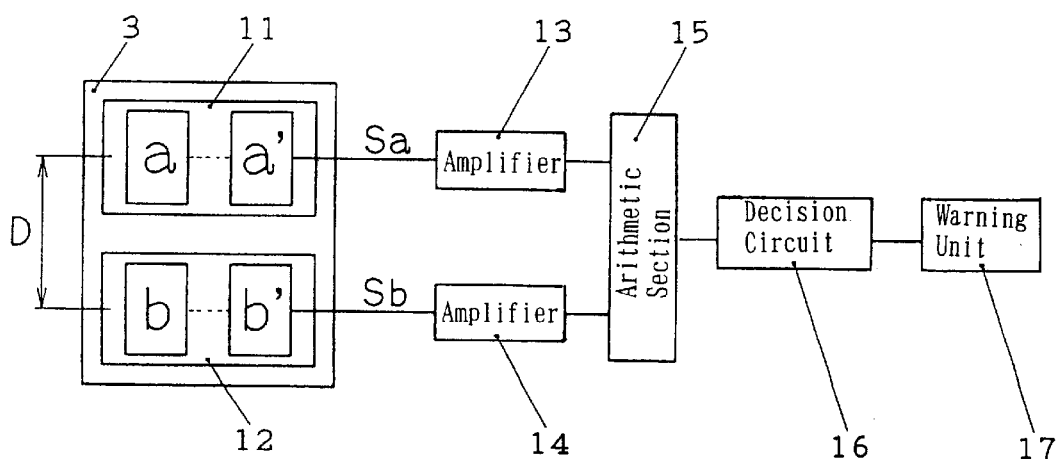
FIG. 9 is a block diagram of a signal processing circuit for a crime prevention sensor system according to the invention.

FIG. 9 shows the outline of a circuit arrangement by which signals from so-called dual twin pyroelectric elements are amplified and calculated to send out a warning. The numerals 13 and 14 denote amplifiers for amplifying differential outputs from twin sensors 11 and 12 consisting of elements a, a' and b, b', respectively; 15 denotes an arithmetic section for arithmetically processing the amplified output; 16 denotes a decision circuit; and 17 denotes a warning unit. The resultant outputs Sa and Sb fed from the twin sensors a, a' and b, b' to the amplifiers 13 and 14, respectively, are connected such that the components from the sensors a and a' are plus and minus, respectively, and the components from the sensors b and b' and plus and minus, respectively.

In addition, the amplifiers 13 and 14 may be omitted by adapting the arithmetic section 15 to have a similar amplifying function. It is arranged that the arithmetic section 15 produces an output signal to actuate the warning unit when the outputs Sa and Sb from the twin sensors a, a' and b, b' produce substantially simultaneous outputs which are in phase with each other.

The description of the embodiments of the invention given so far have been centered on a compound-eye crime prevention sensor systems using dual twin type pyroelectric elements; however, the two detection zones, upper and lower, may be defined by using single type pyroelectric elements or by using a combination of twin type pyroelectric elements and single type pyroelectric elements. Further, the invention is not limited to infrared ray detection devices for detecting radiant energy but is applicable to devices employing other detection systems, so long as they are capable of recognizing the size of a subject to be detected by using two, upper and lower, detection zones.

INDUSTRIAL APPLICABILITY

As the present invention has been made as described above, the spacing between the two, upper and lower, detection zones can be freely set according to the environment in which the detector is installed, thus providing a more reliable ability to detect trespassers (human beings).

What is claimed is:

1. A compound-eye crime prevention sensor system including a first detection axis extending in a direction to keep watch in a predetermined space and a second detection axis extending above or below the first detection axis in a direction parallel with the direction corresponding to the first detection axis, the arrangement being such that the size of a subject to be detected is recognized by detecting whether said subject crosses both of said detection axes at the same time or crosses only one of them, said compound-eye crime prevention sensor system being characterized in that it includes detection spacing changing means for changing the spacing between the upper and lower detection axes according to the angle at which either the upper or the lower detection axis has been set.

2. A compound-eye crime prevention sensor system as set forth in claim 1, characterized in that in the case where said two detection axes are the axes of two fields of view provided by single parabolic mirror to which two pyroelectric element sensors are opposed so that rays therefrom are reflected and focussed, said detection spacing changing means comprises a mechanism which changes the spacing between said two pyroelectric element sensors in operative association with changing the set angle of said upper or lower detection axis.

3. A compound-eye crime prevention sensor system as set forth in claim 1, characterized in that in the case of including two optical units each consisting of a single pyroelectric element sensor opposed to a parabolic mirror, said two detection axes being the axes of the fields of view from the parabolic mirrors of these optical units, said detection spacing changing means comprises a mechanism whereby changing the angle at which one of said optical units is disposed results in the angle at which the other optical unit is disposed being changed more largely than the first-mentioned change of angle.

* * * * *